US012193484B2

(12) United States Patent
Lee et al.

(10) Patent No.: US 12,193,484 B2
(45) Date of Patent: Jan. 14, 2025

(54) SYSTEM AND DEVICE FOR GENERATING AEROSOL WITH PLURALITY OF AEROSOL GENERATING SUBSTRATES

(71) Applicant: KT&G CORPORATION, Daejeon (KR)

(72) Inventors: Seung Won Lee, Daejeon (KR); Sung Wook Yoon, Suwon-si (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 921 days.

(21) Appl. No.: 17/267,872

(22) PCT Filed: Sep. 16, 2020

(86) PCT No.: PCT/KR2020/012505
§ 371 (c)(1),
(2) Date: Feb. 11, 2021

(87) PCT Pub. No.: WO2021/060768
PCT Pub. Date: Apr. 1, 2021

(65) Prior Publication Data

US 2022/0264943 A1 Aug. 25, 2022

(30) Foreign Application Priority Data

Sep. 26, 2019 (KR) ........................ 10-2019-0119092

(51) Int. Cl.
*A24F 40/30* (2020.01)
*A24D 1/20* (2020.01)
(Continued)

(52) U.S. Cl.
CPC ................ *A24F 40/30* (2020.01); *A24D 1/20* (2020.01); *A24F 40/20* (2020.01); *A24F 40/46* (2020.01);
(Continued)

(58) Field of Classification Search
CPC . A24D 1/20; A24F 40/20; A24F 40/53; A24F 40/46; A24F 40/465; A24F 40/57;
(Continued)

(56) References Cited

U.S. PATENT DOCUMENTS 4,889,143 A * 12/1989 Pryor .................. A24D 3/0208 131/331
8,689,804 B2 4/2014 Fernando et al.
(Continued)

FOREIGN PATENT DOCUMENTS

CA 3 076 886 A1 5/2019
CN 102264251 A 11/2011
(Continued)

OTHER PUBLICATIONS

Office Action dated Apr. 21, 2023 from the Chinese Patent Office in Application No. 202080005370.8.
(Continued)

*Primary Examiner* — Nathaniel E Wiehe
*Assistant Examiner* — Dilnessa B Belay
(74) *Attorney, Agent, or Firm* — Sughrue Mion, PLLC

(57) ABSTRACT

An aerosol generating system includes: a cigarette including a first segment and a second segment; a heater generating an aerosol by heating at least a portion of an aerosol generating substrate arranged in the first segment and the second segment; a cigarette recognition sensor detecting an identification element arranged in the first segment or the second segment in the cigarette; and a controller identifying a type of the cigarette on the basis of a result detected by the cigarette recognition sensor and controlling a power supply to the heater to heat the cigarette according to a temperature profile corresponding to the identified type.

6 Claims, 8 Drawing Sheets

(51) Int. Cl.

| | |
|---|---|
| ***A24F 40/20*** | (2020.01) |
| ***A24F 40/46*** | (2020.01) |
| ***A24F 40/465*** | (2020.01) |
| ***A24F 40/51*** | (2020.01) |
| ***A24F 40/53*** | (2020.01) |
| ***A24F 40/57*** | (2020.01) |
| ***H05B 1/02*** | (2006.01) |

(52) U.S. Cl.
CPC ............ *A24F 40/465* (2020.01); *A24F 40/51* (2020.01); *A24F 40/53* (2020.01); *A24F 40/57* (2020.01); *H05B 1/02* (2013.01)

(58) Field of Classification Search
CPC .......... A24F 40/51; A24F 40/30; A24F 40/50; H05B 1/02
See application file for complete search history.

(56) References Cited

U.S. PATENT DOCUMENTS

| | | | |
|---|---|---|---|
| 9,854,841 | B2 | 1/2018 | Ampolini et al. |
| 10,143,232 | B2 | 12/2018 | Talon |
| 10,750,782 | B2 | 8/2020 | Batista |
| 2003/0154991 | A1 | 8/2003 | Fournier et al. |
| 2011/0155153 | A1 | 6/2011 | Thorens et al. |
| 2014/0196736 | A1 | 7/2014 | Fernando et al. |
| 2017/0000192 | A1 | 1/2017 | Li |
| 2017/0231277 | A1 | 8/2017 | Mironov et al. |
| 2020/0029618 | A1 | 1/2020 | Fraser et al. |
| 2020/0093185 | A1 | 3/2020 | Lim |
| 2020/0305512 | A1 | 10/2020 | Lim et al. |
| 2020/0359688 | A1 | 11/2020 | Jang et al. |
| 2021/0022402 | A1* | 1/2021 | Bless ................... G06K 7/1413 |
| 2021/0177041 | A1* | 6/2021 | Aoun ....................... A24C 5/01 |

FOREIGN PATENT DOCUMENTS

| | | | |
|---|---|---|---|
| CN | 102306271 | A | 1/2012 |
| CN | 109608940 | A | 4/2019 |
| EP | 0 917 831 | A1 | 5/1999 |
| EP | 2 201 850 | A1 | 6/2010 |
| JP | 7-333304 | A | 12/1995 |
| JP | 2012-513750 | A | 6/2012 |
| JP | 2019-100912 | A | 6/2019 |
| KR | 10-2011-0096548 | A | 8/2011 |
| KR | 10-2014-0121381 | A | 10/2014 |
| KR | 10-2017-0020801 | A | 2/2017 |
| KR | 10-2018-0111845 | A | 10/2018 |
| KR | 10-2018-0124739 | A | 11/2018 |
| KR | 10-2018-0129637 | A | 12/2018 |
| KR | 10-2019-0093027 | A | 8/2019 |
| KR | 10-2019-0105678 | A | 9/2019 |
| RU | 2016118261 | A | 11/2017 |
| RU | 2644314 | C2 | 2/2018 |
| WO | 2019/115464 | A1 | 6/2019 |
| WO | 2019/151687 | A1 | 8/2019 |

OTHER PUBLICATIONS

International Search Report dated Mar. 4, 2021 from the International Searching Authority in International Application No. PCT/KR2020/012505.
Notification of Reason for Refusal dated Feb. 23, 2021 from the Korean Intellectual Property Office in KR Application No. 10-2019-0119092.
Extended European Search Report dated Oct. 29, 2021 in European Application No. 20851273.1.
Office Action issued Sep. 5, 2022 in Russian Application No. 2021104088/03(008886).
Office Action dated Feb. 24, 2022, issued in Korean Application No. 10-2021-0155957.
Office Action dated Apr. 5, 2022, issued in Japanese Application No. 2021-506520.

* cited by examiner

【Figure 1】
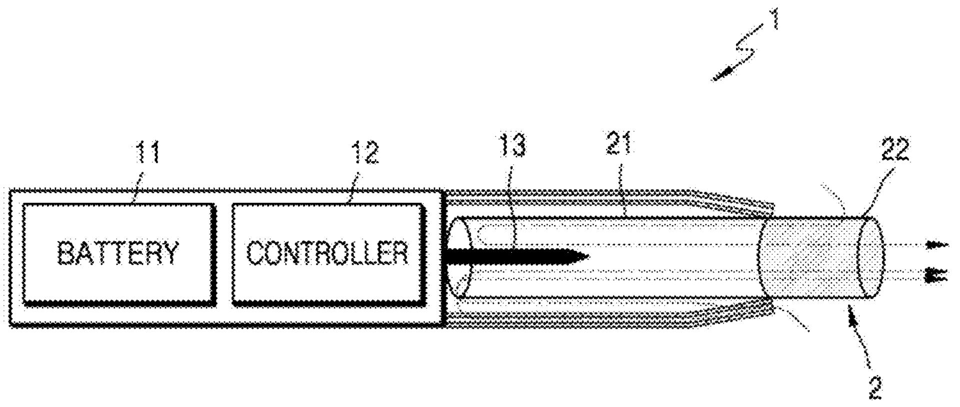
【Figure 2】
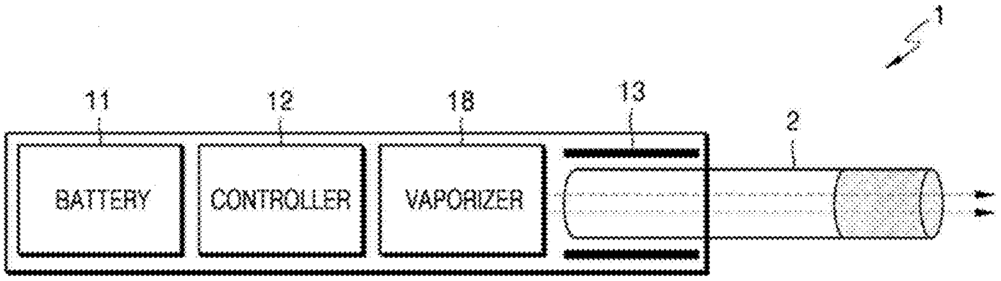
【Figure 3】
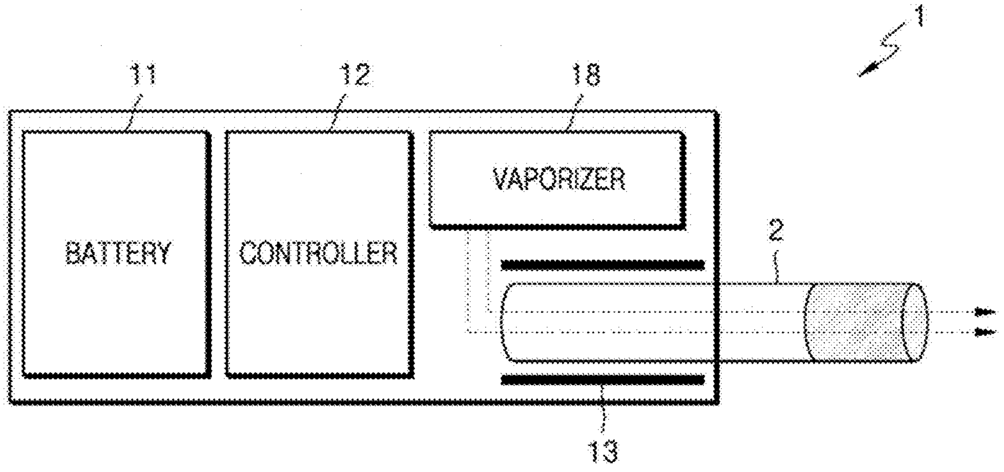

【Figure 4】
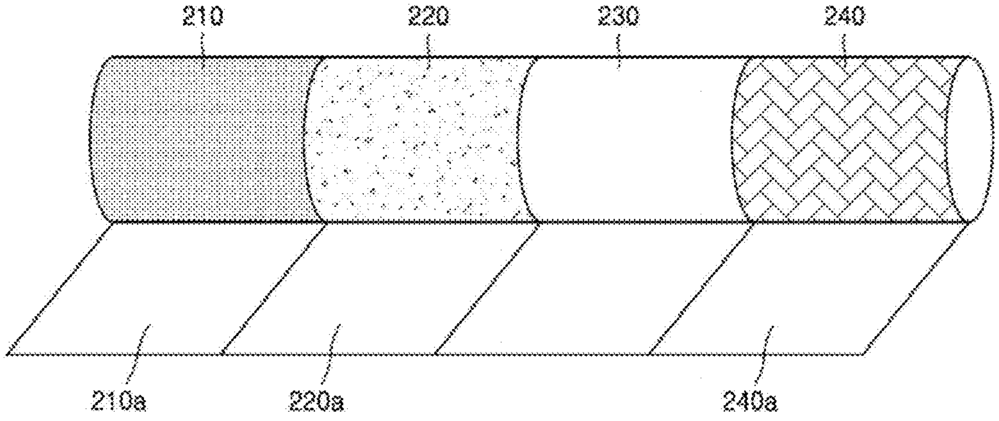
【Figure 5】
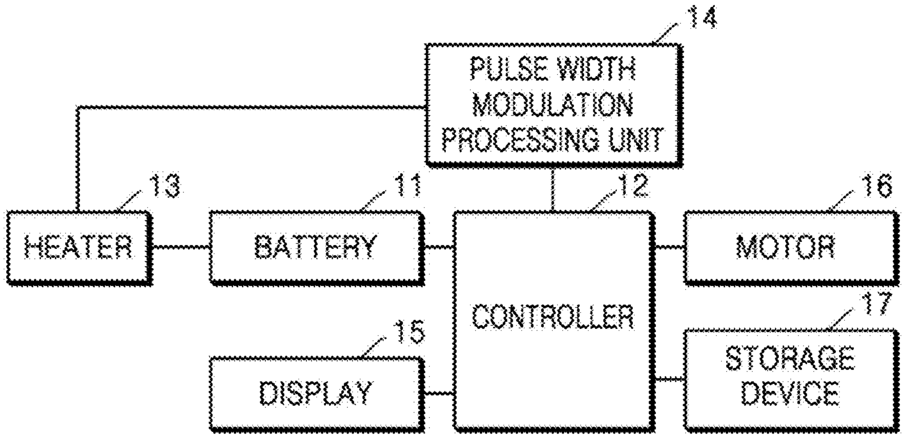

【Figure 6】
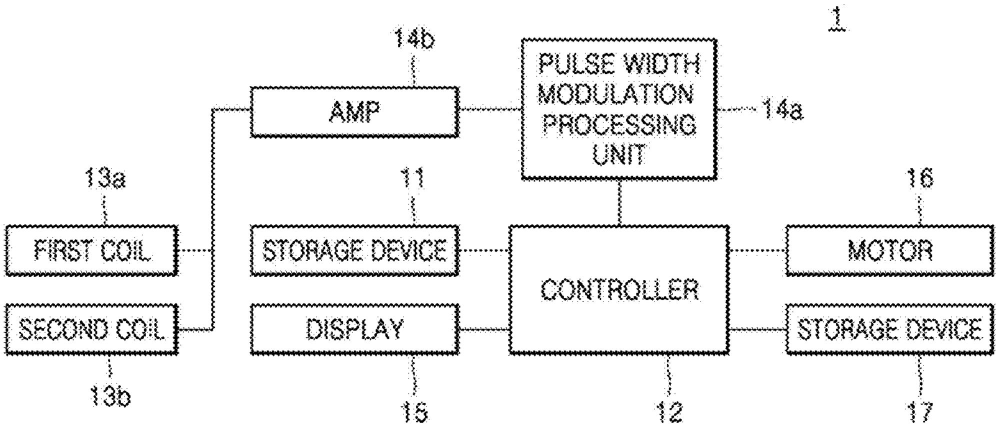
【Figure 7】
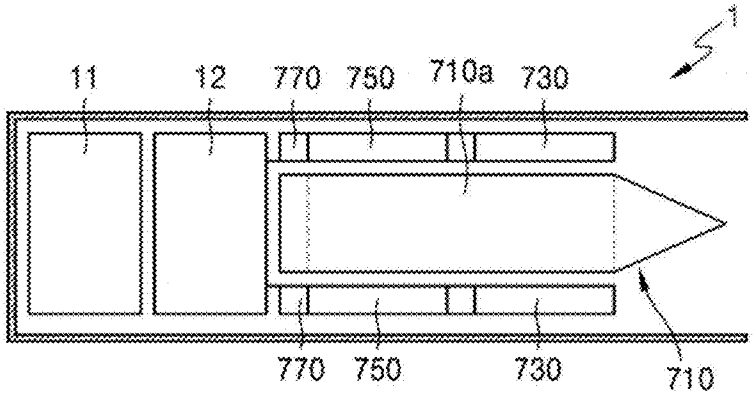

【Figure 8】
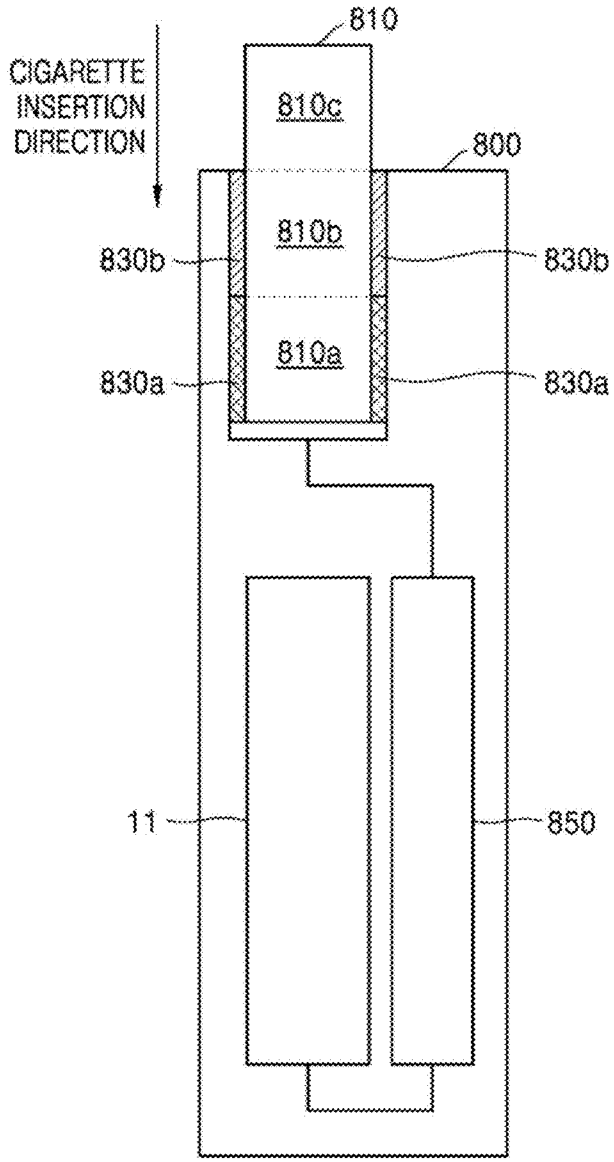

【Figure 9A】
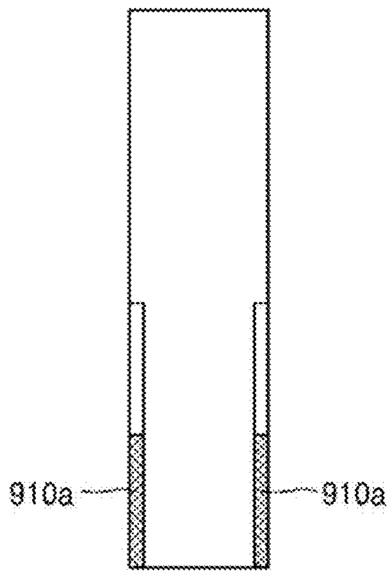
【Figure 9B】
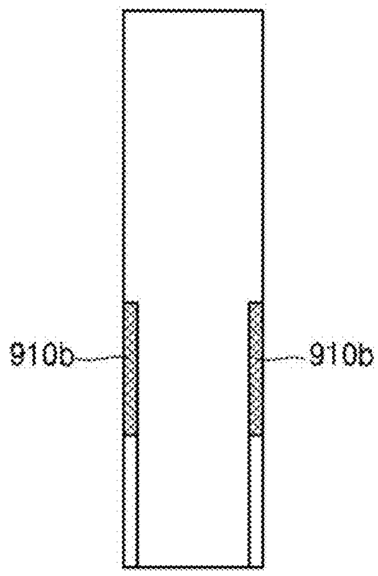

【Figure 10A】
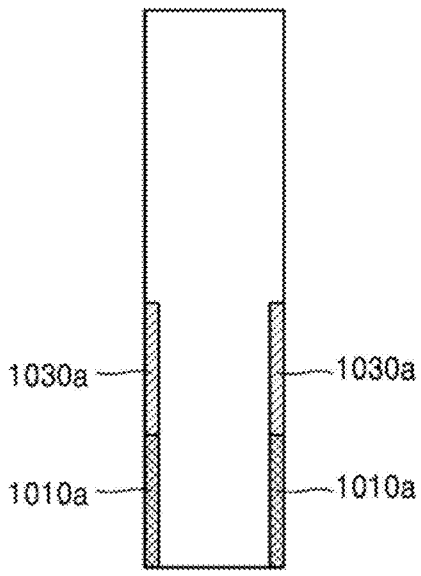
【Figure 10B】
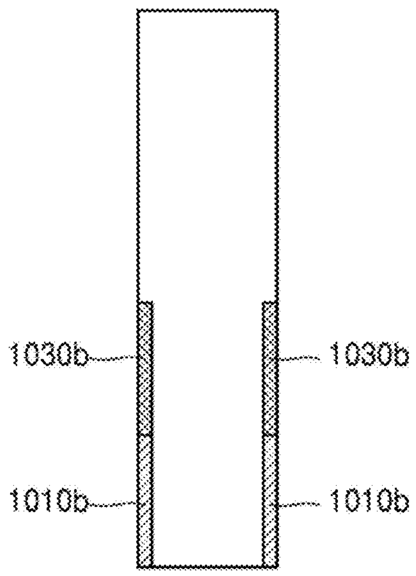

【Figure 11A】
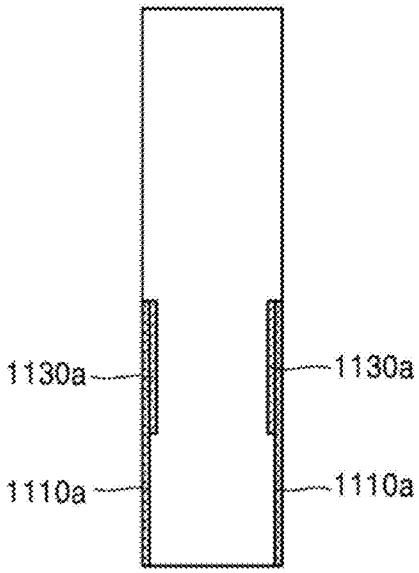
【Figure 11B】
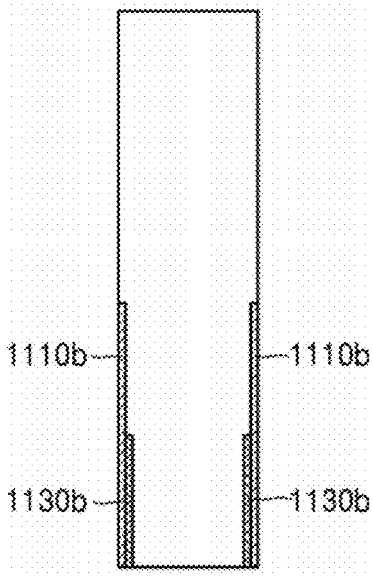

【Figure 12A】
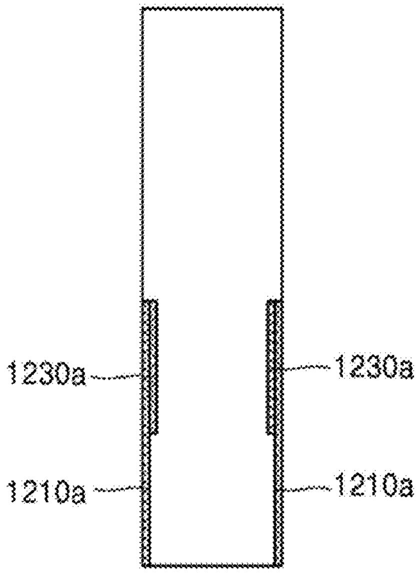
【Figure 12B】
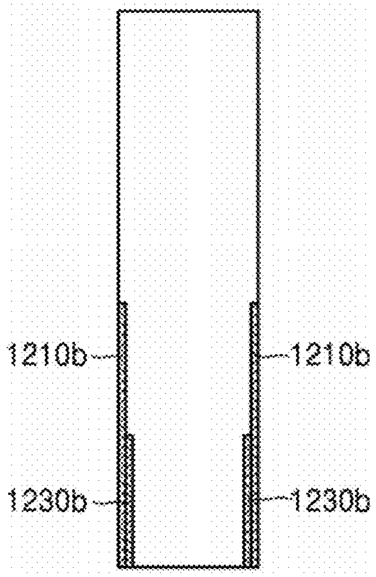

SYSTEM AND DEVICE FOR GENERATING AEROSOL WITH PLURALITY OF AEROSOL GENERATING SUBSTRATES

CROSS REFERENCE TO RELATED APPLICATIONS

This application is a National Stage of International Application No. PCT/KR2020/012505 filed Sep. 16, 2020, claiming priority based on Korean Patent Application No. 10-2019-0119092 filed Sep. 26, 2019.

TECHNICAL FIELD

One or more embodiments relate to a system and device for generating an aerosol with a plurality of aerosol generating substrates, and more particularly, to a system and device for generating an aerosol by heating a plurality of aerosol generating substrates according to different temperature profiles.

BACKGROUND ART

Recently, demand for alternatives to traditional cigarettes. For example, there is growing demand for devices which generate aerosol by heating an aerosol generating material in cigarettes, rather than by combusting cigarettes. Accordingly, research into a heating-type cigarette and a heating-type aerosol generating device has been actively conducted.

As heating-type aerosol generating devices as described above are widely used, various attempts have been made to develop an aerosol generating device that satisfies different tastes of many users.

DISCLOSURE

Technical Problem

An objective of the present invention is to solve a conventional problem with an aerosol generating system for the aerosol generated from a plurality of aerosol generating substrates to provide high satisfaction to a user.

Technical Solution

An aerosol generated by an existing method is not capable of providing a user with high smoking satisfaction and thus is not liked by users familiar with heating-type aerosol generating devices as well as by users using traditional cigarettes. Therefore, one or more embodiments include an aerosol generating device which identifies a type of a cigarette and heats the cigarette according to a temperature profile corresponding to the type of cigarette such that an aerosol generated from a plurality of aerosol generating substrates provide a user with high satisfaction.

Advantageous Effects

According to one or more embodiments, an aerosol capable of providing a user with high satisfaction may be generated.

DESCRIPTION OF DRAWINGS

FIG. 1 is a diagram illustrating an example in which a cigarette is inserted into an aerosol generating device, according to one or more embodiments.

FIG. 2 is a diagram illustrating another example in which a cigarette is inserted into an aerosol generating device, according to one or more embodiments.

FIG. 3 is a diagram illustrating another example in which a cigarette is inserted into an aerosol generating device, according to one or more embodiments.

FIG. 4 is a view illustrating an example of a cigarette accommodated in an aerosol generating device, according to one or more embodiments.

FIG. 5 is a block diagram of an example of an aerosol generating device according to one or more embodiments.

FIG. 6 is a block diagram of another example of an aerosol generating device according to one or more embodiments.

FIG. 7 is a view schematically illustrating a configuration of another example of an aerosol generating device, according to one or more embodiments.

FIG. 8 is a view schematically illustrating another example of an aerosol generating device, according to one or more embodiments.

FIG. 9A is a view for explaining an embodiment in which a cigarette recognition sensor identifies a type of cigarette by detecting an identification element in only one segment among a first segment and a second segment.

FIG. 9B is a view for explaining another embodiment in which a cigarette recognition sensor identifies a type of cigarette by detecting an identification element in only one segment among a first segment and a second segment.

FIG. 10A is a view for explaining an embodiment in which a cigarette recognition sensor identifies a type of cigarette by detecting a first identification element and a second identification element in a first segment and a second segment.

FIG. 10B is a view for explaining another embodiment in which a cigarette recognition sensor identifies a type of cigarette by detecting a first identification element and a second identification element in a first segment and a second segment.

FIG. 11A is a view for explaining an embodiment in which a cigarette recognition sensor identifies a type of cigarette by detecting a first identification element extending throughout a first segment and a second segment and a second identification segment in only the second segment.

FIG. 11B is a view for explaining another embodiment in which a cigarette recognition sensor identifies a type of cigarette by detecting a first identification element extending throughout a first segment and a second segment and a second identification segment in only the first segment.

FIG. 12A is a view for explaining an embodiment in which a cigarette recognition sensor identifies a type of cigarette by detecting a first identification element and a second identification element.

FIG. 12B is a view for explaining another embodiment in which a cigarette recognition sensor identifies a type of cigarette by detecting a first identification element and a second identification element.

BEST MODE

According to one or more embodiments, a system includes: a cigarette including a first segment and a second segment; a heater generating an aerosol by heating at least a portion of an aerosol generating substrate arranged in the first segment and the second segment; a cigarette recognition sensor detecting an identification element arranged in the first segment or the second segment in the cigarette; and a controller identifying a type of the cigarette on the basis of a result detected by the cigarette recognition sensor, and controlling a power supply to the heater to heat the cigarette according to a temperature profile corresponding to the identified type.

The first segment may include a first substrate providing a user with a first aerosol, and the second segment may include a second substrate providing the user with a second aerosol.

The first substrate may be a substrate related to the amount of nicotine transfer in the cigarette, and the second substrate may be a substrate related to the amount of glycerin transfer in the cigarette.

The heater may include: a contact-type heater contacting and heating the aerosol generating substrate; and/or a non-contact-type heater heating the aerosol generating substrate without contacting the aerosol generating substrate, from outside of wrapping paper surrounding the aerosol generating substrate.

The cigarette recognition sensor may include two or more cigarette recognition sensors, wherein, on the basis of results detected by the cigarette recognition sensors, the controller identifies different aerosol generating substrates using the cigarette recognition sensors.

The cigarette may include a first identification element arranged in the first segment or a second identification element arranged in the second segment.

The cigarette may include different identification elements respectively arranged in the first segment and the second segment.

The cigarette may include a first identification element arranged in the first segment and the second segment and a second identification element arranged in the first segment or the second segment.

The cigarette may include a first identification element in the first segment and a second identification element in the second segment, wherein at least one of a thickness, an area, a weight, a pattern, a shape, a material, and a color is different between the first identification element and the second identification element.

According to one or more embodiments, a cigarette generates an aerosol when mounted and heated in a device and includes: a substrate portion including an aerosol generating substrate; and a non-substrate portion which does not include an aerosol generating substrate, wherein the substrate portion includes a first segment and a second segment which are detectable by a cigarette recognition sensor of the device.

The substrate portion may include an identification element in only one segment among the first segment and the second segment, wherein the identification element is detectable by the cigarette recognition sensor.

The substrate portion may include a first identification element in the first segment and a second identification element in the second segment, wherein the first identification element and the second identification element are detectable by the cigarette recognition sensor.

The substrate portion may include a first identification element in both the first segment and the second segment and a second identification element in only one of the first segment and the second segment, wherein the first identification element and the second identification element are detectable by the cigarette recognition sensor.

The substrate portion may include a first identification element in the first segment and a second identification element in the second segment, wherein the second identification element matches the first identification element with respect to at least one of a thickness, an area, a weight, a pattern, a shape, a material, and a color, and the first identification element and the second identification element are detectable by the cigarette recognition sensor.

According to one or more embodiments, a device includes: a heater generating an aerosol by heating an aerosol generating substrate; a cigarette recognition sensor detecting a first segment and a second segment of a cigarette; and a controller identifying a type of the cigarette on the basis of a result detected by the cigarette recognition sensor and controlling a power supply to the heater to heat the cigarette according to a temperature profile corresponding to the identified type.

Mode for Invention

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein.

Hereinafter, embodiments of the present disclosure will be described in detail with reference to the drawings.

FIGS. 1 to 3 are diagrams showing examples in which a cigarette is inserted into an aerosol generating device.

Referring to FIG. 1, an aerosol generating device 1 includes a battery 11, a controller 12, and a heater 13. Referring to FIG. 2 and FIG. 3, the aerosol generating device 1 further includes a vaporizer 18. Also, a cigarette 2 may be inserted into an inner space of the aerosol generating device 1.

The elements related to the embodiment are illustrated in the aerosol generating device 1 of FIGS. 1 to 3. Therefore, one of ordinary skill in the art would appreciate that other universal elements than the elements shown in FIGS. 1 to 3 may be further included in the aerosol generating device 1.

Also, FIGS. 2 and 3 show that the aerosol generating device 1 includes the heater 13, but if necessary, the heater 13 may be omitted.

In FIG. 1, the battery 11, the controller 12, and the heater 13 are arranged in a row. Also, FIG. 2 shows that the battery 11, the controller 12, the vaporizer 18, and the heater 13 are arranged in a row. Also, FIG. 3 shows that the vaporizer 18 and the heater 13 are arranged in parallel with each other. However, an internal structure of the aerosol generating device 1 is not limited to the examples shown in FIGS. 1 to 3. That is, according to a design of the aerosol generating device 1, arrangement of the battery 11, the controller 12, the heater 13, and the vaporizer 18 may be changed.

When the cigarette 2 is inserted into the aerosol generating device 1, the aerosol generating device 1 operates the heater 13 and/or the vaporizer 18 to generate aerosol from the cigarette 2 and/or the vaporizer 18. The aerosol generated by the heater 13 and/or the vaporizer 18 may be transferred to a user via the cigarette 2.

If necessary, even when the cigarette 2 is not inserted in the aerosol generating device 1, the aerosol generating device 1 may heat the heater 13.

The battery 11 supplies the electric power used to operate the aerosol generating device 1. For example, the battery 11 may supply power for heating the heater 13 or the vaporizer 18 and supply power for operating the controller 12. In addition, the battery 11 may supply power for operating a display, a sensor, a motor, and the like installed in the aerosol generating device 1.

The controller 120 controls the overall operation of the aerosol generating device 1. In detail, the controller 12 may control operations of other elements included in the aerosol generating device 1, as well as the battery 11, the heater 13, and the vaporizer 18. Also, the controller 12 may check the status of each component in the aerosol generating device 1 to determine whether the aerosol generating device 1 is in an operable state.

The controller 12 includes at least one processor. A processor can be implemented as an array of a plurality of logic gates or can be implemented as a combination of a general-purpose microprocessor and a memory in which a program executable in the microprocessor is stored. It will be understood by one of ordinary skill in the art that the present disclosure may be implemented in other forms of hardware.

The heater 13 may be heated by the electric power supplied from the battery 11. For example, when the cigarette is inserted in the aerosol generating device 1, the heater 13 may be located outside the cigarette. Therefore, the heated heater 13 may raise the temperature of an aerosol generating material in the cigarette.

The heater 13 may be an electro-resistive heater. For example, the heater 13 includes an electrically conductive track, and the heater 13 may be heated as a current flows through the electrically conductive track. However, the heater 13 is not limited to the above example, and any type of heater may be used provided that the heater is heated to a desired temperature. Here, the desired temperature may be set in advance on the aerosol generating device 1, or may be set by a user.

In addition, in another example, the heater 13 may include an induction heating type heater. In detail, the heater 13 may include an electrically conductive coil for heating the cigarette in an induction heating method, and the cigarette may include a susceptor that may be heated by the induction heating type heater.

For example, the heater 13 may include a tubular type heating element, a plate type heating element, a needle type heating element, or a rod type heating element, and may heat the inside or outside of the cigarette 2 according to the shape of the heating element.

Also, there may be a plurality of heaters 13 in the aerosol generating device 1. Here, the plurality of heaters 13 may be arranged to be inserted into the cigarette 2 or on the outside of the cigarette 2. Also, some of the plurality of heaters 13 may be arranged to be inserted into the cigarette 2 and the other may be arranged on the outside of the cigarette 2. In addition, the shape of the heater 13 is not limited to the example shown in FIGS. 1 to 3, but may be manufactured in various shapes.

The vaporizer 18 may generate aerosol by heating a liquid composition and the generated aerosol may be delivered to the user after passing through the cigarette 2. In other words, the aerosol generated by the vaporizer 18 may move along an air flow passage of the aerosol generating device 1, and the air flow passage may be configured for the aerosol generated by the vaporizer 18 to be delivered to the user through the cigarette 2.

For example, the vaporizer 18 may include a liquid storage unit, a liquid delivering unit, and a heating element, but is not limited thereto. For example, the liquid storage unit, the liquid delivering unit, and the heating element may be included in the aerosol generating device 1 as independent modules.

The liquid storage may store a liquid composition. For example, the liquid composition may be a liquid including a tobacco containing material including a volatile tobacco flavor component, or a liquid including a non-tobacco material. The liquid storage unit may be attached to/detached from the vaporizer 18 or may be integrally manufactured with the vaporizer 18.

For example, the liquid composition may include water, solvents, ethanol, plant extracts, flavorings, flavoring agents, or vitamin mixtures. The flavoring may include, but is not limited to, menthol, peppermint, spearmint oil, various fruit flavoring ingredients, etc. The flavoring agent may include components that may provide the user with various flavors or tastes. Vitamin mixtures may be a mixture of at least one of vitamin A, vitamin B, vitamin C, and vitamin E, but are not limited thereto. Also, the liquid composition may include an aerosol former such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivering unit. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 18 may be referred to as a cartomizer or an atomizer, but is not limited thereto.

In addition, the aerosol generating device 1 may further include universal elements, in addition to the battery 11, the controller 12, the heater 13, and the vaporizer 18. For example, the aerosol generating device 1 may include a display capable of outputting visual information and/or a motor for outputting tactile information. In addition, the aerosol generating device 1 may include at least one sensor (a puff sensor, a temperature sensor, a cigarette insertion sensor, etc.) Also, the aerosol generating device 1 may be manufactured to have a structure, in which external air may be introduced or internal air may be discharged even in a state where the cigarette 2 is inserted.

Although not shown in FIGS. 1 to 3, the aerosol generating device 1 may configure a system with an additional cradle. For example, the cradle may be used to charge the battery 11 of the aerosol generating device 1. The heater 13 may be heated in a state in which the cradle and the aerosol generating device 1 are coupled to each other.

The cigarette 2 may be similar to a general combustive cigarette. For example, the cigarette 2 may include a first portion containing an aerosol generating material and a second portion including a filter and the like. The second portion of the cigarette 2 may also include the aerosol generating material. For example, an aerosol generating material made in the form of granules or capsules may be inserted into the second portion.

The entire first portion may be inserted into the aerosol generating device 1 and the second portion may be exposed to the outside. Alternatively, only a portion of the first portion may be inserted into the aerosol generating device 1 or the entire first portion and a portion of the second portion may be inserted into the aerosol generating device 1. The user may puff aerosol while holding the second portion by the mouth of the user. At this time, the aerosol is generated by as the outside air passes through the first portion, and the generated aerosol passes through the second portion and is delivered to a user's mouth.

For example, the outside air may be introduced through at least one air passage formed in the aerosol generating device 1. For example, opening and closing of the air passage and/or the size of the air passage may be adjusted by a user. Accordingly, the amount and quality of the aerosol may be adjusted by the user. In another example, the outside air may be introduced into the cigarette 2 through at least one hole formed in a surface of the cigarette 2.

FIG. 4 is a view illustrating an example of a cigarette which is accommodated in an aerosol generating device, according to an embodiment.

A cigarette for an aerosol generating device 1 according to one or more embodiments may also be referred to as an aerosol generating article. The cigarette may include a plurality of aerosol generating substrates, and different aerosol generating substrates may be included in different segments of the cigarette. Referring to FIG. 4, the cigarette includes a first segment 210 and a second segment 220, and different aerosol generating substrates are included in the respective segments 210 and 220. For convenience of description, FIG. 4 only illustrates the first segment 210 and the second segment 220 which include aerosol generating substrates, and a third segment 230 and a fourth segment 240 which do not include aerosol generating substrates. However, more than two types of aerosol generating substrates may be included in a cigarette. Thus, according to an embodiment, a cigarette may include more than two segments.

The first segment 210 of the cigarette may include a first substrate for generating a first aerosol. As an example, the first segment 210 of the cigarette may be at least one of glycerin, propylene glycol, ethylene glycol, dipropylene glycol, diethylene glycol, triethylene glycol, tetraethylene glycol, and oleyl alcohol, but is not limited thereto. An aerosol generating substrate included in the first segment 210 improves smoking satisfaction of a user by increasing the amount of glycerin transfer of an aerosol.

The second segment 220 of the cigarette may include a second substrate for generating a second aerosol. As an example, the second segment 220 of the cigarette may be a medium for generating nicotine and may be a tobacco including nicotine. The tobacco included in the second segment 220 may include general tobacco fragments manufactured in the form of a sheet or strands. An aerosol generating substrate included in the second segment 220 may improve smoking satisfaction of the user by increasing the amount of nicotine transfer of an aerosol. In one or more embodiments, aerosol generating substrates included in the first segment 210 and the second segment 220 may respectively generate a first gas and a second gas when heated, and the first gas and the second gas may be mixed to finally become an aerosol that may be puffed by the user.

The first segment 210 and the second segment 220 may be individually surrounded by wrapping paper. In FIG. 4, the wrapping paper may include the first segment wrapping paper **210*a* and the second segment wrapping paper 220*a*. Particular patterns that may be detected by a cigarette recognition sensor may be printed on outer surfaces of the first segment wrapping paper 210*a* and the second segment wrapping paper 220*a*. Also, according to one or more embodiments, the first segment wrapping paper 210*a* and the second segment wrapping paper 220*a* may be surrounded by aluminum foil. The first segment 210 and the second segment 220 surrounded by the aluminum foil will be described in detail with reference to FIGS. 9 through 12**.

The third segment 230 of the cigarette may be a cooling segment. The third segment 230 may enable a user to puff an aerosol of a proper, by cooling aerosols generated in the first segment 210 and the second segment 220 at an appropriate temperature. As an example, the third segment 230 may be manufactured by adding a plasticizer to cellulose acetate tow and may be a tube-type structure having a hollow inside.

The fourth segment 240 of the cigarette may be a filter segment. The fourth segment 240 may be manufactured by adding a plasticizer to cellulose acetate tow. Also, the fourth segment 240 may be formed to generate a flavor. As an example, a flavored liquid may be injected onto the fourth segment 240 or an additional fiber coated with a flavored liquid may be inserted into the fourth segment 240.

Also, the fourth segment 240 may include at least one capsule having a configuration in which a liquid including a flavoring material is wrapped with a film. The capsule may have a spherical or cylindrical shape and may burst by application of preset or higher pressure by the user before or while smoking starts, thereby enabling the user to puff a flavored aerosol. Like the first segment 210 and the second segment 220, the fourth segment 240 may also be surrounded by wrapping paper. As an example, polylactic aid wrapping paper may be used as fourth segment wrapping paper **240*a***.

FIG. 5 is a block diagram of an example of the aerosol generating device 1 according to an embodiment of the disclosure.

Referring to FIG. 5, the aerosol generating device 1 according to the embodiment includes the controller 12, the battery 11, the heater 13, a pulse-width modulation processing unit 14, a display 15, a motor 16, and a storage device 170.

The controller 12 overall controls the battery 11, the heater 13, the pulse-width modulation processing unit 14, the display 15, the motor 16, and the storage device 170 included in the aerosol generating device 1. Although not shown in FIG. 5, in some embodiments, the controller 12 may further include an input receiver for receiving a button input or a touch input from a user and a communicator that may communicate with an external communication device such as a user terminal. Although not shown in FIG. 5, the controller 12 may further include a module for performing proportional integral difference (PID) control on the heater 13.

In particular, the controller 12 may receive, from a plurality of geomagnetic sensors of the display 15, a result of detecting a change in intensity of an internal magnetic field of the aerosol generating device to thereby detect in real time whether a detachable element is attached to and/or detached from the aerosol generating device and to provide the user with an alarm through the display 15, the motor 16, or the like.

The battery 11 supplies electric power to the heater 13, and the level of the electric power supplied to the heater 13 may be adjusted by the controller 12.

The heater 13 generates heat due to an intrinsic resistance when receiving the electric power. When an aerosol generating material is heated by the heater, the aerosol may be generated. Referring to FIG. 4, a heater 13 generates an aerosol by heating at least a portion of an aerosol generating substrate arranged in the first segment and the second segment.

The pulse-width modulation processing unit 14 may allow the controller 12 to control the electric power supplied to the heater 13 by sending a pulse-width modulation (PWM) signal to the heater 13. In some embodiments, the pulse-width modulation processing unit 14 may be included in the controller 12.

The display 15 visually outputs various alarm messages of the aerosol generating device 1 to the user. The user may check a low-battery message, an overheat alarm message of the heater, etc. output on the display 15, and may take measures before the aerosol generating device 1 stops operating or is damaged.

The motor 16 is driven by the controller 12 and notifies the user of whether the aerosol generating device 1 is ready for use through a tactile response.

The storage device 17 may store various information by which the controller 12 appropriately controls the electric power supplied to the heater 13 so that various flavors are provided to the user of the aerosol generating device 1. For example, the information stored in the storage device 17 may include a temperature profile that is referred to by the controller 12 for controlling the temperature of the heater to be appropriately reduced or increased according to lapse of time, a controller reserve ratio that will be described later, a comparing control value, etc. The information may be sent to the controller 12 according to a request from the controller 12. The storage device 17 may include a non-volatile memory such as a flash memory, or may include a volatile memory that temporarily stores data only during being conducted in order to ensure fast data input/output (I/O) speed.

FIG. 6 is a block diagram of another example of an aerosol generating device, according to an embodiment.

While FIG. 5 schematically illustrates the block diagram of the aerosol generating device described with reference to FIGS. 1 through 3, FIG. 6 schematically illustrates a block diagram of an aerosol generating device generating an aerosol by an induction heating method. The descriptions of components of FIG. 6 which are the same as those of FIG. 5 will be omitted herein.

A PWM control signal output from the pulse width modulation processing unit 14*a* is transmitted to a first coil 13*a* and a second coil 13*b* through an amplifier AMP 14*b*. In FIG. 6, a controller 12 generates each control signal to be transmitted to the first coil 13*a* or the second coil 13*b*, and send it through the pulse width modulation processing unit 14*a* such that a PWM signal is transmitted to the first coil 13*a* or the second coil 13*b*. Although not illustrated in FIG. 6, components for performing impedance matching may be added to receiving ends of the first coil 13*a* and the second coil 13*b* to maximize the supplied power.

The controller 12, the pulse width modulation processing unit 14 or 14*a*, the display 15, the storage device 17, and the vaporizer 18 of FIGS. 1-3, 5, and 6 may correspond to at least one processor or may include at least one processor. As a result, the controller 12, the pulse width modulation processing unit 14*a*, the display 15, the storage device 17, and the vaporizer 18 may be included in another hardware device such as a microprocessor or a computer system.

Also, although FIG. 6 only shows the first coil 13*a* and the second coil 13*b*, the number of coils included in the aerosol generating device 1 may be greater than two, and a plurality of coils have different inductance or different numbers of windings per unit length.

FIG. 7 is a view schematically illustrating a configuration of another example of an aerosol generating device, according to an embodiment.

Referring to FIG. 7, an aerosol generating device 1 includes a battery 11, a controller 12, a susceptor 710, a first coil 730, a second coil 750, and a bobbin 770. Other components may be further included, but description thereof will be omitted herein for convenience of description. The battery 11 and the controller 12 perform the same functions as those described with reference to FIGS. 1 through 6. Hereinafter, the first coil 730 and the second coil 750 may be referred to as a magnetic field generation unit.

The susceptor 710 is an induction heater formed of a material which is heated by an alternating magnetic field that is generated by the first coil 730 and the second coil 750 when alternating currents are applied to the coils. The susceptor 710 refers to a material capable of converting electromagnetic energy into heat, and an eddy current induced to the susceptor 710 by the alternating magnetic field heats the susceptor 710. Here, a magnetic hysteresis loss inside the susceptor 710 may additionally heat the susceptor 710. When a cigarette including an aerosol generating substrate is inserted onto the susceptor 710, the aerosol generating substrate of the cigarette may directly or indirectly contact the heated susceptor 710. As such, the aerosol generating substrate may be heated, and thus an aerosol may be generated.

The susceptor 710 of FIG. 7 may include a susceptor heating portion 710*a*. The susceptor heating portion 710*a* refers to a portion which is affected and heated by the magnetic field of the first coil 730 and the second coil 750, and includes a susceptor material such as iron or aluminum. The remaining portion of the susceptor 710 may contact a portion of the cigarette, such as a filter, which does not include an aerosol generating substrate. In this regard, it is preferable that the remaining portion of the susceptor 710 does not include a susceptor material. Otherwise, a user may have an unpleasant smoking experience when the filter of the cigarette melts or when a hot aerosol is generated by heating of the remaining portion of the susceptor 710.

The first coil 730 and the second coil 750 generate the alternating magnetic field by alternating currents, and the magnetic field generated around the first coil 730 and the second coil 750 cause the susceptor heating portion 710*a* of the susceptor 710 to be heated. The principle of heating the susceptor heating portion 710*a* is as described above and thus is omitted herein. The first coil 730 and the second coil 750 have different physical properties and are supplied with alternating currents of different magnitudes. Therefore, a taste of the cigarette provided to the user may be optimized by controlling a heating state of the susceptor heating portion 710*a*. According to one or more embodiments, an aerosol may be generated by a susceptor by an induction heating method in which the first coil 730 and the second coil 750 are provided with time-varying alternating currents based on data that is accumulated experimentally or empirically.

In an embodiment, the controller 12 may control heating of the first coil 730 and the second coil 750 with alternating currents of different magnitudes based on a temperature profile. In other words, the controller 12 may control the first coil 730 and the second coil 750 according to temperature profiles such that the susceptor heating portion 710*a* heats the first segment 210 and the second segment 220 of the cigarette 2 differently.

The bobbin 770 functions as a means for smoothly winding the first coil 730 and the second coil 750.

FIG. 7 illustrates the aerosol generating device 1 in which the susceptor 710 is formed as a needle type. However, according to one or more embodiments, the susceptor 710 may be implemented as a fine particle included inside the cigarette 2 and may be heated by the magnetic field generated by the first coil 730 and the second coil 750. In other words, embodiments are not limited to types of susceptors and may be applied to all types of induction heating-type aerosol generating devices 1 using the cigarette 2.

FIG. 8 is a view schematically illustrating another example of an aerosol generating device, according to an embodiment.

Referring to FIG. 8, an aerosol generating device 800 according to an embodiment may include a cigarette 810, a first sensor 830*a*, a second sensor 830*b*, a controller 850, and a battery 11. The aerosol generating device 800 illustrated in FIG. 8 may include other components similar to those of an aerosol generating device illustrated in FIGS. 1, 2, 3, and 7. Also, FIG. 8 is a view for explaining that the cigarette 810 is inserted into a cigarette insertion hole provided in the aerosol generating device 800 to thereby allow a first segment 810*a* and a second segment 810*b* of the cigarette 810 to be arranged close to the first sensor 830*a* and the second sensor 830*b*. Therefore, description about components described above with reference to FIGS. 1, 2, 3, and 7 will be omitted herein.

In FIG. 8, the cigarette 810 includes two types of aerosol generating substrates respectively in the first segment 810*a* and the second segment 810*b*. The aerosol generating substrates included in the first segment 810*a* and the second segment 810*b* are vaporized or aerosolized by being heated according to different temperature profiles. The third segment 810*c* of the cigarette 810 may include a cooling segment and a filter segment described with reference to FIG. 4. According to one or more embodiments, the first segment 810*a* and the second segment 810*b* may be collectively referred to as a substrate portion, and the third segment 810*c* may be referred to as a non-substrate portion.

Since the cigarette 810 includes two types of aerosol generating substrates, the aerosol generating device 800 may include two cigarette recognition sensors. The cigarette recognition sensors detect an identification element arranged in the first segment 810*a* or the second segment 810*b*. In other words, the first sensor 830*a* detects the first segment 810*a* of the cigarette 810, and the second sensor 830*b* detects the second segment 810*b* of the cigarette 810.

That is, the first sensor 830*a* monitors a position corresponding to the first segment 810*a* in the entire cigarette 810. When the first segment 810*a* has a unique identification element (i.e., first identification element) for distinguishing the first segment 810*a* from the second segment 810*b*, the first sensor 830*a* transmits, to the controller 850, a result of detecting the first identification element in the first segment 810*a*. Likewise, the second sensor 830*b* monitors a position corresponding to the second segment 810*b* in the entire cigarette 810. If the second segment 810*b* has a unique identification element (i.e., second identification element) for distinguishing the second segment 810*b* from the first segment 810*a*, the second sensor 830*b* transmits, to the controller 850, a result of detecting the second identification element in the second segment 810*b*.

According to one or more embodiments, an automatic heating algorithm which automatically heats a heater by detecting that the cigarette 810 is fully inserted may be executed by the controller 850. To this end, the controller 850 has to confirm that the cigarette 810 is appropriate for use in the aerosol generating device 800 and identify temperature profiles for the two types of aerosol generating substrates included in the cigarette. In more detail, after the cigarette 810 is inserted into the cigarette insertion hole such that both the first segment 810*a* and the second segment 810*b* including the aerosol generating substrates are positioned in the cigarette insertion hole, compatibility of the cigarette 810 and types of aerosol generating substrates included in the cigarette 810 need to be identified. If the two conditions are satisfied, the heater may be automatically heated by the controller 850.

As an example, the first sensor 830*a* may detect the identification element of the first segment 810*a*. On the basis of the identification element detected by the first sensor 830*a*, the controller 850 may identify the aerosol generating substrate included in the first segment 810*a* and at the same time determine whether or not the cigarette 810 is compatible with the aerosol generating device 800. The first sensor 830*a* may be one of an optical sensor, an infrared sensor, an ultrasonic sensor, a hardness measurement sensor (e.g., push-pull gauge), a capacitive sensor, and a resistance measurement sensor. Also, the first segment 810*a* may have unique properties in thickness, area, weight, color, pattern, hardness, resistance, reflectivity, etc. such that the first segment 810*a* may be detected by the above-described sensor. In one or more embodiments, the identification element of the first segment 810*a* may be provided by wrapping paper surrounding the aerosol generating substrate included in the first segment 810*a*, and may include physical properties (e.g., thickness, area, weight, color, pattern, hardness, resistance, reflectivity, and the like) which may be detected (i.e., identified) by the first sensor 830*a*.

As another example, the first sensor 830*a* may detect the aerosol generating substrate of the first segment 810*a*. In more detail, the first sensor 830*a* may detect information according to characteristics of the aerosol generating substrate included in the first segment 810*a* and transmit the detection result to the controller 850. For example, the first sensor 830*a* may be a sensor which transmits a magnetic field signal of a preset frequency, reads a frequency signal of a magnetic field reflected from the aerosol generating substrate of the first segment 810*a*, and transmits the frequency signal to the controller 850. In this case, the first segment 810*a* must not include an identification element which may be meaningfully detected by the first sensor 830*a*, which will be described in detail with reference to FIG. 9.

The second sensor 830*b* performs, with respect to the second segment 810*b*, the same function as the first sensor 830*a*.

The controller 850 controls various types of components of the aerosol generating device 800, with power supplied from the battery 11. Also, the controller 850 collects, from the first sensor 830*a* and the second sensor 830*b*, information about the aerosol generating substrates included in the first segment 810*a* and the second segment 810*b* to thereby determine whether or not the cigarette 810 inserted into the aerosol generating device 800 is a compatible type. If the cigarette 800 is compatible, the controller 850 determines whether or not a temperature profile for appropriately heating the aerosol generating substrates included in the cigarette 810 is pre-stored. If the cigarette 810 is an appropriate (i.e., compatible) cigarette supported in the aerosol generating device 800 and a temperature profile for heating two types of aerosol generating substrates of the cigarette 810 is found, the controller 850 heats the heater by supplying power to the heater.

In FIG. 8, it is assumed that the cigarette 810 only includes two segments. However, it will be obvious that according to one or more embodiments, the cigarette 810 may include three or more segments, and accordingly, the aerosol generating device 800 may include cigarette recognition sensors respectively corresponding to the segments. As such, the aerosol generating substrates may be heated according to different temperature profiles for respective segments.

FIG. 9A is a view for explaining an embodiment in which a cigarette recognition sensor identifies a type of cigarette by detecting an identification element existing in one of a first segment and a second segment.

FIG. 9B is a view for explaining another embodiment in which a cigarette recognition sensor identifies a type of cigarette by detecting an identification element existing in one of a first segment and a second segment. Hereinafter, for convenience of description, the cigarette 810 of FIG. 8 inserted into the cigarette insertion hole will be referred to.

Referring to FIGS. 9A and 9B, an identification element which may be detected by the first sensor 830*a* or the second sensor 830*b* may be included in one of the first segment 810*a* and the second segment 810*b*. In other words, a cigarette of FIGS. 9A and 9B includes a first identification element arranged in the first segment 810*a* or a second identification element arranged in the second segment 810*b*.

Referring to FIG. 9A, the first sensor 830*a* may detect an identification element 910*a* existing in the first segment 810*a*. On the other hand, since an identification element does not exist in the second segment 810*b*, the second sensor 830*b* may determine that the identification element does not exist in the second segment 810*b*. Also, the second sensor 830*b* may detect an aerosol generating substrate included in the second segment 810*b*. As described above, the second sensor 830*b* may transmit a magnetic field signal of a preset frequency to the second segment 810*b* and detect characteristics of an aerosol generating substrate with a signal reflected from the second segment 810*b*. Also, an identification element may refer to characteristic information such as pattern, hardness, resistance, etc. of wrapping paper surrounding the corresponding segment of the cigarette.

Referring to FIG. 9B, the second sensor 830*b* may detect an identification element 910*b* existing in the second segment 810*b*. On the other hand, since an identification element does not exist in the first segment 810*a*, the first sensor 830*a* may determine that the identification element does not exist in the first segment 810*a*. In an embodiment, the first sensor 830*a* may detect an aerosol generating substrate included in the first segment 810*a*.

Based on the detection results from the first sensor 830*a* and the second sensor 830*b*, the controller 850 may determine that the cigarette of FIGS. 9A and 9B is an appropriate cigarette because an identification element is only detected in one of the first segment 810*a* and the second segment 810*b*.

FIG. 10A is a view for explaining an embodiment in which a cigarette recognition sensor identifies a type of cigarette by detecting a first identification element in a first segment and a second identification element in a second segment.

FIG. 10B is a view for explaining another embodiment in which a cigarette recognition sensor identifies a type of cigarette by detecting a first identification element in a first segment and a second identification element in a second segment.

Referring to FIGS. 10A and 10B, identification elements which may be detected by the first sensor 830*a* or the second sensor 830*b* may be included in the first segment 810*a* and the second segment 810*b*, respectively. In other words, a cigarette of FIGS. 10A and 10B includes different identification elements which are arranged in the first segment 810*a* and the second segment 810*b*, respectively.

Referring to FIG. 10A, the first sensor 830*a* may detect an identification element 1010*a* existing in the first segment 810*a*, and the second sensor 830*b* may detect an identification element 1030*a* existing in the second segment 810*b*. Also, as another example, referring to FIG. 10B, the first sensor 830*a* may detect an identification element 1010*b* existing in the first segment 810*a*, and the second sensor 830*b* may detect an identification element 1030*b* existing in the second segment 810*b*.

The controller 850 may receive and synthesize the results of detecting the identification elements by the first sensor 830*a* and the second sensor 830*b* to thereby determine that the cigarette of FIGS. 10A and 10B is an appropriate cigarette because the different identification elements are detected in the first segment 810*a* and the second segment 810*b*.

FIG. 11A is a view for explaining an embodiment in which a cigarette recognition sensor identifies a type of cigarette by detecting a first identification element extending over a first segment and a second segment and a second identification element existing only in the second segment.

FIG. 11B is a view for explaining another embodiment in which a cigarette recognition sensor identifies a type of cigarette by detecting a first identification element extending over a first segment and a second segment and a second identification element existing only in the first segment.

Referring to FIGS. 11A and 11B, identification elements which may be detected by the first sensor 830*a* or the second sensor 830*b* may be respectively included in the first segment 810*a* and the second segment 810*b*. Also, types and numbers of the identification elements included in the first segment 810*a* and the second segment 810*b* may be different from each other. In other words, a cigarette of FIGS. 11A and 11B includes a first identification element arranged in the first segment 810*a* and the second segment 810*b* and a second identification element arranged in the second segment 810*b*.

Referring to FIG. 11A, the first sensor 830*a* may detect one identification element 1110*a* existing in the first segment 810*a*, and the second sensor 830*b* may detect two types of identification elements 1110*a* and 1130*a* in the second segment 810*b*. Also, as another example, referring to FIG. 11B, the first sensor 830*a* may detect two types of identification elements 1110*b* and 1130*b* in the first segment 810*a*, and the second sensor 830_b_ may detect the identification element 1110_b_ existing in the second segment 810_b_. In FIGS. 11A and 11B, one identification element exists over the first segment 810_a_ and the second segment 810_b_. Therefore, the numbers of identification elements detected by the first sensor 830_a_ and the second sensor 830_b_ may be different from each other. Here, an identification element existing over two segments and an identification element existing only in one segment may be different identification elements in terms of thickness, area, weight, pattern, and/or shape. For example, the first and second identification elements may be made of different materials.

The controller 850 may receive and synthesize the results of detecting identification elements by the first sensor 830_a_ and the second sensor 830_b_ to thereby determine that the cigarette of FIGS. 11A and 11B is an appropriate cigarette because identification elements of different numbers are detected in the first segment 810_a_ and the second segment 810_b_.

FIG. 12A is a view for explaining an embodiment in which a cigarette recognition sensor identifies a type of cigarette by detecting a first identification element and a second identification element which share at least one of thickness, area, weight, pattern, and/or shape.

FIG. 12B is a view for explaining another embodiment in which a cigarette recognition sensor identifies a type of cigarette by detecting a first identification element and a second identification element which share at least one of thickness, area, weight, pattern, and/or shape.

Referring to FIGS. 12A and 12B, identification elements which may be detected by the first sensor 830_a_ or the second sensor 830_b_ may be respectively included in the first segment 810_a_ and the second segment 810_b_. Also, the identification elements of FIGS. 12A and 12B are made of the same material or have the same color. In other words, a cigarette of FIGS. 12A and 12B may include a first identification element existing in the first segment 810_a_ and a second identification element existing in the second segment 810_b_, which are different from each other in terms of thickness, area, weight, pattern, shape, material and/or color.

Referring to FIG. 12A, the first sensor 830_a_ may detect one identification element 1210_a_ existing in the first segment 810_a_, and the second sensor 830_b_ may detect two types of identification elements 1210_a_ and 1230_a_ in the second segment 810_b_. Also, as another example, referring to FIG. 12B, the first sensor 830_a_ may detect two types of identification elements 1210_b_ and 1230_b_ in the first segment 810_a_, and the second sensor 830_b_ may detect one identification element 1210_b_ existing in the second segment 810_b_. The embodiments of FIGS. 12A and 12B are similar to those of FIG. 11A or 11B in that one identification element may exist over the first segment 810_a_ and the second segment 810_b_, and thus, the numbers of identification elements detected by the first sensor 830_a_ and the second sensor 830_b_ may be different. However, the embodiments of FIGS. 12A and 12B are distinguished from those of FIGS. 11A and 11B in that identification elements for respective segments have the same material or the same color, and thus may be separately detected based on other properties such as thickness, area, weight, and pattern.

The controller 850 may receive and synthesize results of detecting identification elements by the first sensor 830_a_ and the second sensor 830_b_ to thereby determine that the cigarette of FIGS. 12A and 12B is an appropriate cigarette the first segment 810_a_ and the second segment 810_b_ have different numbers of identification elements which have the same material or color but are different from each other in thickness, area, weight, pattern, and the like. For example, aluminum foil may be detected in the first segment 810_a_ while aluminum foil and copper foil are detected in the second segment 810_b_. In this case, a controller of FIG. 11A or 11B may determine that the cigarette is an appropriate cigarette, whereas a controller of FIG. 12A or 12B may determine that the cigarette is an inappropriate cigarette. As described above, the first sensor 830_a_ and the second sensor 830_b_ may color detecting sensors, resistance measurement sensors, or the like. Also, the first sensor 830_a_ and the second sensor 830_b_ may be optical sensors for measuring reflection, a refractive index, and the like of light.

FIGS. 9A through 12B illustrate that the cigarette includes two types of aerosol generating substrates, but this is merely for convenience of description. One or more embodiments may include a plurality of aerosol generating substrates, and it will be obvious to one of ordinary skill in the art that the descriptions of FIGS. 9A through 12B may also be applied to a cigarette including three or more types of aerosol generating substrates and an aerosol generating device using the cigarette.

In one or more embodiments, a controller may identify appropriateness (i.e., compatibility with the aerosol generating device) of the cigarette inserted into an aerosol generating device and aerosol generating substrates included in the cigarette based on a result detected by a cigarette recognition sensor corresponding to each segment of a cigarette, and the cigarette is heated only when both the two conditions are satisfied. As such, a user's smoking satisfaction may be improved, without requiring user's manipulation of the aerosol generating device. The embodiments may be applied to any aerosol generating devices using a cigarette including a plurality of aerosol generating substrates.

One or more embodiments described above may be implemented in the form of a computer program that may be executed on a computer through various components, and such a computer program may be recorded in a computer-readable recording medium. At this time, the computer-readable recording medium may be a magnetic medium (e.g., a hard disk, a floppy disk, and a magnetic tape), an optical recording medium (e.g., a CD-ROM and a DVD), a magneto-optical medium (e.g., a floptical disk), and a hardware device specifically configured to store and execute program instructions (e.g., a ROM, a RAM, and a flash memory).

Meanwhile, the computer program recorded on the medium may be specially designed and configured for example embodiments or may be published and available to one of ordinary skill in computer software. Examples of computer programs include machine language code such as code generated by a compiler, as well as high-level language code that may be executed by a computer using an interpreter or the like.

Specific implementations described in one or more embodiments are examples, and do not limit the scope of one or more embodiments in any way. For brevity of description, descriptions of conventional electronic components, control systems, software, and other functional aspects of the systems may be omitted. Furthermore, the connecting lines, or connectors shown in the various figures presented are intended to represent exemplary functional relationships and/or physical or logical couplings between the various elements, and it should be noted that many alternative or additional functional relationships, physical connections or circuit connections may be present in a practical device. Moreover, no item or component is essential to the practice of one or more embodiments unless the element is specifically described as "essential" or "critical".

At least one of the components, elements, modules or units (collectively "components" in this paragraph) represented by a block in the drawings such as the controller 12 or the pulse width modulation processor 14 in FIGS. 1-3 and 5-6, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The use of the terms "a" and "an" and "the" and similar referents in the context of describing one or more embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. One or more embodiments are not limited to the described order of the steps. The use of any and all examples, or exemplary language (e.g., "such as") provided herein, is intended merely to better illuminate the present disclosure and does not pose a limitation on the scope of one or more embodiments unless otherwise claimed. Numerous modifications and adaptations will be readily apparent to one of ordinary skill in the art without departing from the spirit and scope of one or more embodiments.

The invention claimed is:

1. An aerosol generating system comprising:
- a cigarette including a mouth piece and a substrate portion including a first segment and a second segment;
- a heater configured to generate an aerosol by heating at least a portion of an aerosol generating substrate arranged in the first segment and the second segment;
- a cigarette recognition sensor comprising:
  - a first sensor configured to detect the aerosol generating substrate arranged in the first segment in the cigarette by transmitting a first magnetic field signal of a first preset frequency and detecting a first signal reflected from the aerosol generating substrate of the first segment; and
  - a second sensor configured to detect the aerosol generating substrate arranged in the second segment in the cigarette by transmitting a second magnetic field signal of a second preset frequency and detecting a second signal reflected from the aerosol generating substrate of the second segment; and
- a controller configured to:
  - identify a type of the cigarette based on a detection result of the first sensor and the second sensor, and
  - control power supplied to the heater such that the cigarette is heated according to a temperature profile corresponding to the identified type.

2. The aerosol generating system of claim 1, wherein the first segment includes a first substrate providing a user with a first aerosol, and the second segment includes a second substrate providing the user with a second aerosol.

3. The aerosol generating system of claim 2, wherein
- the first substrate is related to an amount of nicotine transfer in the cigarette, and
- the second substrate is related to an amount of glycerin transfer in the cigarette.

4. The aerosol generating system of claim 1, wherein the heater comprises at least one of:
- a contact-type heater configured to heat the aerosol generating substrate by contacting the aerosol generating substrate; and
- a non-contact-type heater configured to heat the aerosol generating substrate without contacting the aerosol generating substrate, and arranged outside of wrapping paper surrounding the aerosol generating substrate.

5. The aerosol generating system of claim 1, wherein
- the cigarette recognition sensor includes a plurality of sensors, and
- the controller is configured to identify different aerosol generating substrates based on detection results of the plurality of sensors.

6. An aerosol generating device comprising:
- a heater configured to generate an aerosol by heating an aerosol generating substrate;
- a cigarette recognition sensor comprising:
  - a first sensor configured to detect the aerosol generating substrate arranged in a first segment of a cigarette by transmitting a first magnetic field signal of a first preset frequency and detecting a first signal reflected from the aerosol generating substrate of the first segment; and
  - a second sensor configured to detect the aerosol generating substrate arranged in a second segment of the cigarette by transmitting a second magnetic field signal of a second preset frequency and detecting a second signal reflected from the aerosol generating substrate of the second segment; and
- a controller configured to:
  - identify a type of the cigarette, based on a detection result of the first sensor and the second sensor, and
  - control power supplied to the heater such that the cigarette is heated according to a temperature profile corresponding to the identified type,
- wherein the cigarette includes a mouth piece.

* * * * *